(12) United States Patent
Mehbubani

(10) Patent No.: US 10,006,157 B2
(45) Date of Patent: Jun. 26, 2018

(54) POWDER RESIN LAYERED NONWOVEN MATERIAL AND METHOD OF CONSTRUCTION THEREOF

(71) Applicant: Federal-Mogul Powertrain, Inc., Southfield, MI (US)

(72) Inventor: Ritesh Mehbubani, Telford, PA (US)

(73) Assignee: Federal-Mogul Powertrain LLC, Southfield, MI (US)

( * ) Notice: Subject to any disclaimer, the term of this patent is extended or adjusted under 35 U.S.C. 154(b) by 157 days.

(21) Appl. No.: 14/070,237

(22) Filed: Nov. 1, 2013

(65) Prior Publication Data

US 2014/0120306 A1    May 1, 2014

Related U.S. Application Data

(60) Provisional application No. 61/721,349, filed on Nov. 1, 2012.

(51) Int. Cl.

| | |
|---|---|
| *D04H 13/00* | (2006.01) |
| *D04H 11/04* | (2006.01) |
| *B32B 5/02* | (2006.01) |
| *B32B 5/16* | (2006.01) |
| *B32B 5/30* | (2006.01) |

(52) U.S. Cl.
CPC ............. *D04H 13/00* (2013.01); *B32B 5/022* (2013.01); *B32B 5/16* (2013.01); *B32B 5/30* (2013.01); *D04H 11/04* (2013.01); *B32B 2250/40* (2013.01); *B32B 2262/0253* (2013.01); *B32B 2262/0269* (2013.01); *B32B 2262/0276* (2013.01); *B32B 2262/065* (2013.01); *B32B 2264/0278* (2013.01); *B32B 2264/0292* (2013.01); *Y10T 428/24215* (2015.01)

(58) Field of Classification Search
CPC ..................... D04H 11/04; Y10T 428/24215
USPC ................................................. 427/180, 202
See application file for complete search history.

(56) References Cited

U.S. PATENT DOCUMENTS

| | | | |
|---|---|---|---|
| 2,736,362 A * | 2/1956 | Philipps et al. | 428/113 |
| 4,053,674 A | 10/1977 | Buck, Jr. | |
| 4,840,832 A | 6/1989 | Weinle et al. | |
| 5,370,921 A | 12/1994 | Cedarleaf | |
| 5,397,618 A | 3/1995 | Cedarleaf | |
| 5,492,580 A | 2/1996 | Frank | |
| 5,721,177 A | 2/1998 | Frank | |
| 2004/0070101 A1 | 4/2004 | Wang et al. | |
| 2008/0305704 A1* | 12/2008 | Provost et al. | 442/360 |
| 2009/0169836 A1* | 7/2009 | Thomas | 428/196 |

(Continued)

FOREIGN PATENT DOCUMENTS

WO          9014457 A1    11/1990

OTHER PUBLICATIONS

International search report dated Jan. 8, 2014 (PCT/US2013/067709).

*Primary Examiner* — Alexander M Weddle
(74) *Attorney, Agent, or Firm* — Robert L. Stearns; Dickinson Wright, PLLC

(57) ABSTRACT

A powder resin layered nonwoven material and a method of construction thereof are provided. The method includes forming a nonwoven web; applying a powder resin material on the nonwoven web to form a coated portion of the nonwoven web; and cross-lapping the nonwoven web to sandwich separate powder resin layers of the powder resin material between layers of the nonwoven web.

8 Claims, 1 Drawing Sheet

(56) References Cited

U.S. PATENT DOCUMENTS

2010/0064491 A1     3/2010   Dumas
2011/0088841 A1*   4/2011   Thunhorst ............ B29C 39/148
                                                             156/307.5
2011/0108218 A1     5/2011   Flack

* cited by examiner

POWDER RESIN LAYERED NONWOVEN MATERIAL AND METHOD OF CONSTRUCTION THEREOF

CROSS-REFERENCE TO RELATED APPLICATION

This application claims the benefit of U.S. Provisional Application Ser. No. 61/721,349, filed Nov. 1, 2012, which is incorporated herein by reference in its entirety.

BACKGROUND OF THE INVENTION

1. Technical Field

This invention relates generally to nonwoven materials, and more particularly to methods of constructing nonwoven materials having powder resin dispersed therein.

2. Related Art

It is known to form nonwoven materials having powder resin impregnated therein, such as may be desired to provide enhanced fire resistance, moisture resistance, formability, or the like, to the nonwoven material. Unfortunately, the current methods of constructing nonwoven materials including a powder resin dispersed therein have drawbacks that affect the ability to produce a nonwoven material having the dispersion of resin desired, and also are wasteful and thus, costly. Current processes used to incorporate a powder resin in a nonwoven material include the following: first, blending the fibers being used to form the nonwoven material with a resin and then forming the nonwoven material with the coated fibers, or second, forming the nonwoven material and then forcing the resin into the formed nonwoven material via pressure and suction. In either case, the amount of resin incorporated into the nonwoven material is dependent on the density of the resin powder used and also the uniformity/density of the nonwoven material. Accordingly, the ability to bind the fibers with the resin can be adversely affected if the density of the resin powder does not allow adequate resin powder pick-up during the coating process of the fibers. Further, any variation in the uniformity or density of the nonwoven material can adversely affect the distribution and content of the resin within the nonwoven material. In addition, when using pressure and suction to incorporate the resin within the nonwoven material, a relatively high amount of resin losses are incurred since they use air pressure and vacuum to introduce the resin powder into the preformed nonwoven matt, thereby allowing fine resin powder to be blown outwardly from the nonwoven matt, thus, ultimately resulting in a cost increase to manufacture the resin impregnated nonwoven material.

A method of constructing a nonwoven material having resin dispersed therein in accordance with the invention overcomes or greatly diminishes the problems discussed above, as well as others, which will become evident to those possessing ordinary skill in the art of nonwoven materials upon viewing the teachings herein.

SUMMARY OF THE INVENTION

In accordance with one aspect of the invention, a method of constructing a nonwoven material having powder resin dispersed therein is provided. The method includes forming a nonwoven web; applying a powder resin layer on the nonwoven web to form a coated portion of the nonwoven web; and cross-lapping the nonwoven web to sandwich separate powder resin layers of the powder resin material between layers of the nonwoven web.

In accordance with another aspect of the invention, the method further includes applying the powder resin material to the nonwoven web while cross-lapping the nonwoven web.

In accordance with another aspect of the invention, the method further includes reverse folding an uncoated first portion of the nonwoven web over the powder resin material during the cross-lapping to sandwich a first powder resin layer between the coated portion and first uncoated portion.

In accordance with another aspect of the invention, the method further includes applying the powder resin layer to the first uncoated portion and then overlying a second uncoated portion of the nonwoven web on the powder resin layer during the cross-lapping step to sandwich the powder resin layer between the first and second uncoated portions.

In accordance with another aspect of the invention, the method further includes applying the powder resin material on the reversed folded first portion and reverse folding an uncoated second portion of the nonwoven web over the powder resin material during the cross-lapping to sandwich a second powder resin layer between the reversed folded first and second portions.

In accordance with another aspect of the invention, the method further includes regulating the amount of powder resin material applied to the nonwoven web.

In accordance with another aspect of the invention, the method further includes forming the nonwoven web having a weight between about 0.1 g/sqyd/layer to 15 g/sqyd/layer.

In accordance with another aspect of the invention, the method further includes forming the nonwoven web having a thickness between about 1-2 mm/layer.

In accordance with another aspect of the invention, a powder resin layered nonwoven material is provided. The powder resin layered nonwoven material includes a nonwoven web with a powder resin material applied on the nonwoven web. The nonwoven web has a plurality of reverse folds with a plurality of separate powder resin layers of the powder resin material sandwiched between layers of the nonwoven web.

In accordance with another aspect of the invention, the powder resin layered nonwoven material can be formed having a weight between about 0.1 g/sqyd/layer to 15 g/sqyd/layer.

In accordance with another aspect of the invention, the powder resin layered nonwoven material can be formed having a thickness between about 1-2 mm/layer.

BRIEF DESCRIPTION OF THE DRAWINGS

These and other aspects, features and advantages of the present invention will become more readily appreciated when considered in connection with the following detailed description of presently preferred embodiments and best mode, appended claims and accompanying drawings, in which:

DETAILED DESCRIPTION OF PRESENTLY PREFERRED EMBODIMENTS

Figure 1:
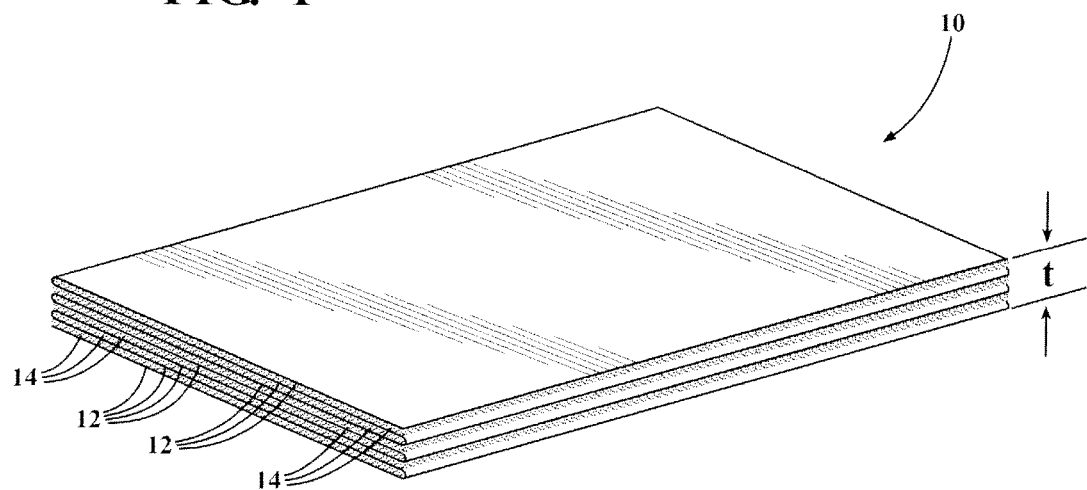
FIG. 1 is a perspective view of a powder resin layered nonwoven material constructed in accordance with one aspect of the invention.
Figure 2:
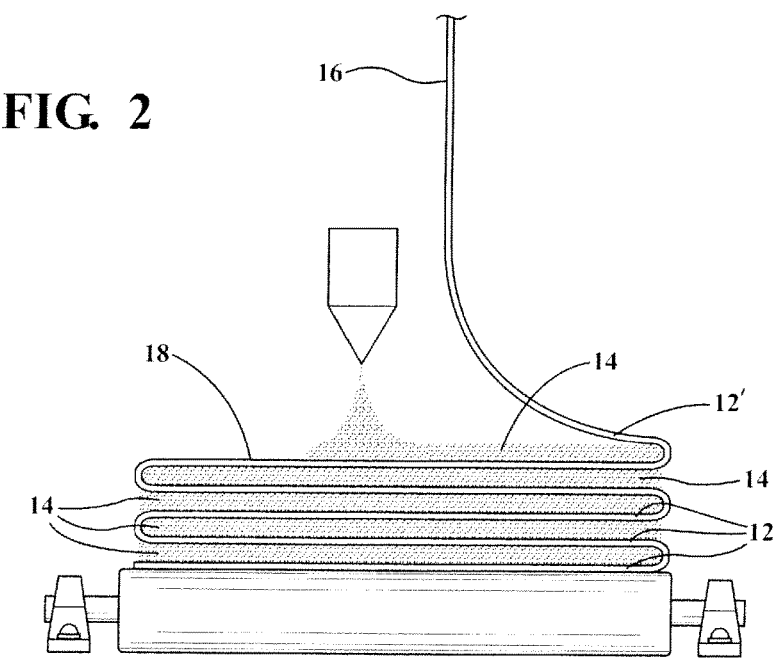
FIG. 2 illustrates a method of constructing the powder resin layered nonwoven material of FIG. 1 in accordance with another aspect of the invention.

Referring in more detail to the drawings, FIG. 1 illustrates a powder resin coated nonwoven material 10 constructed in accordance with one aspect of the invention, such as may be used in various applications, including, by way of example and without limitation, high temperature hood insulators, moldable heat shields, heat shield without adhesive (adhesives tend to reduce the useful application temperature), and nonwovens thermally bonded with thermoplastics and thermosets. The powder resin coated nonwoven material 10 is constructed as a unitary, single sheet of material including a plurality of reverse folds of nonwoven layers 12 with a powder resin layer 14 sandwiched between adjacent overlying nonwoven layers 12. The process used to construct the powder resin coated nonwoven layer 10 results in the desired amount of powder resin layer material in each powder resin layer 14 of the coated nonwoven material 10, regardless of the density of the nonwoven layers 12 or the density of the powder resin material being used. Accordingly, the coated nonwoven material 10 is constructed having the uniform or substantially uniform physical properties desired, regardless of the density of the constituent ingredients. Further yet, the coated nonwoven material 10 and method of construction thereof is economical in manufacture in that waste of the resin material is minimized.

The nonwoven layers 12 are first constructed as a lightweight nonwoven web 16, such as in a carding process, by way of example and without limitation, having a weight between about 0.1 oz/sqyd/layer to 15 g/sqyd/layer (grams per square yard), for example. The web 16 can be constructed of any combination of textile fibers desired, such as, natural fibers including kenaf, flax, hemp, jute, cotton and the like, and/or manmade fibers, including polyester, polypropylene, polyethylene, meta-aramid fibers, para-aramid fiber, depending on the requirements of the intended application. Upon forming the web 16, the web 16 is then transferred to a cross-lapping process where the plurality of reverse folded overlying layers 12 are formed. As the layers 12 are being formed, the selected powder resin material, such as a powder resin material including polyesters, polyurethanes, phenolic, melamines, epoxy polyimides, cyanate esters, is applied to an upper surface 18 of one layer 12, and then, an upper layer 12' is reverse folded back over the resin coated layer 12, also referred to as bottom layer. This process continues for as many layers 12, 12', 14 as are desired to arrive at the finished powder resin coated nonwoven material 10.

By applying the powder resin layer 14 to the individual overlying layers 12 of the web 16, the amount of powder resin material used and the resin pick-up can be tightly controlled independently from the web forming process. Accordingly, the amount of powder resin material being applied to the web 16, and the thickness of each powder resin layer 14 can be controlled and made uniform across the entire web 16. In addition, since the powder resin material is being applied between each overlying nonwoven layer 12 of the web 16 during the cross-lapping process, the distribution of the powder resin material can be made uniform and is not affected or otherwise altered by the density of the powder resin material or the density of the web 16. Further yet, the application of the powder resin layer 14 to the nonwoven layers 12 does not require pressure or vacuum to impregnate the nonwoven layers 12 with the powder resin material of the powder resin layers 14, as the powder resin layer 14 is sandwiched between the layers 12 during cross-lapping. Accordingly, the waste of powder resin material during manufacture is minimal. Additionally, since the web 16 can be made having a very thin thickness, such as between about 1-2 mm/layer, and light weight construction, such as between about 0.1 oz/sqyd/layer to 15 g/sqyd/layer, the overall thickness (t) and end weight of the material 10 can be provided as desired and tightly controlled due to the ability to form as many reverse folded, overlapping layers 12 as desired while tightly regulating the amount and thickness of resin material applied between each overlying layer 12.

The powder resin material can be dispersed under a tightly controlled monitoring and feeding system, such as a system including a powder resin feeder with metered pumps, transfer tubing and discharge nozzle, by way of example and without limitation. Regardless of the type of powder resin dispensing system, the system should be able to regulate the rate at which the powder resin material is being dispersed. Accordingly, the powder resin material is sprayed, by way of example and without limitation, onto each layer 12 to the desired quantity and thickness as required to meet the specifications of the coated nonwoven material 10 for the intended application.

Many modifications and variations of the present invention are possible in light of the above teachings. It is, therefore, to be understood that the invention may be practiced otherwise than as specifically described, and that the scope of the invention is defined by any ultimately allowed claims.

What is claimed is:

1. A method of constructing a powder resin layered nonwoven material without air pressure or vacuum pressure, comprising:

forming a nonwoven web having opposite first and second sides;

applying a first layer of powder resin material on the first side of an uncoated first portion of the nonwoven web to form a first coated portion of the nonwoven web;

cross-lapping the nonwoven web by reverse-folding an uncoated second portion of the nonwoven web over the first coated portion to sandwich the first layer of powder resin material between the coated first portion and the uncoated second portion;

applying a second layer of powder resin material on the second side of the uncoated second portion to form a second coated portion; and cross-lapping the nonwoven web by reverse-folding an uncoated third portion of the nonwoven web over the second coated portion to sandwich the second layer of powder resin material between the coated second portion and the uncoated third portion.

2. The method of claim 1 further including applying the powder resin material to the nonwoven web while cross-lapping the nonwoven web.

3. The method of claim 1 further including regulating the amount of powder resin material applied to the nonwoven web.

4. The method of claim 1 further including forming the nonwoven web having a weight between about 0.1 g/sqyd/layer to 15 g/sqyd/layer prior to applying the powder resin material on the web.

5. The method of claim 4 further including forming the nonwoven web having a thickness between about 1-2 mm/layer prior to applying the powder resin material on the nonwoven web and prior to cross-lapping the nonwoven web.

6. A powder resin layered nonwoven material, comprising:

a nonwoven web;

a powder resin material applied on said nonwoven web, said powder resin material forming powder resin layers on opposite sides of said nonwoven web, said nonwoven web not having air pressure or vacuum pressure impregnated powder resin material therein; and wherein said nonwoven web has a plurality of reverse folds forming overlying layers with said powder resin layers forming separate powder resin layers sandwiched between each of said overlying layers such that said separate powder resin layers are spaced from one another by said overlying layers, wherein said overlying layers are substantially free from air pressure or vacuum pressure impregnated powder resin material.

7. The powder resin layered nonwoven material of claim 6 wherein said nonwoven web has a weight between about 0.1 g/sqyd/layer to 15 g/sqyd/layer.

8. The powder resin layered nonwoven material of claim 7 wherein a single layer of said nonwoven web has a thickness between about 1-2 mm/layer.

\* \* \* \* \*